US012668300B2

(12) United States Patent
Koudai et al.

(10) Patent No.: US 12,668,300 B2
(45) Date of Patent: Jun. 30, 2026

(54) STEERING CONTROL DEVICE THAT LIMITS TORQUE OUTPUT BY A MOTOR

(71) Applicants: JTEKT CORPORATION, Kariya (JP); TOYOTA JIDOSHA KABUSHIKI KAISHA, Toyota (JP); DENSO CORPORATION, Kariya-city (JP)

(72) Inventors: Takashi Koudai, Okazaki (JP); Yuji Fujita, Okazaki (JP); Yugo Nagashima, Anjo (JP); Yuuta Kajisawa, Okazaki (JP); Kazuma Hasegawa, Anjo (JP); Masaharu Yamashita, Toyota (JP); Yosuke Yamashita, Nagoya (JP); Shintaro Takayama, Toyota (JP); Hiroki Tomizawa, Kariya-city (JP); Nobuyori Nakajima, Kariya-city (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 253 days.

(21) Appl. No.: 17/970,789

(22) Filed: Oct. 21, 2022

(65) Prior Publication Data

US 2023/0131995 A1 Apr. 27, 2023

(30) Foreign Application Priority Data

Oct. 25, 2021 (JP) ................................. 2021-173729

(51) Int. Cl.
B62D 5/04 (2006.01)

(52) U.S. Cl.
CPC ......... B62D 5/0484 (2013.01); B62D 5/0463 (2013.01)

(58) Field of Classification Search
None
See application file for complete search history.

(56) References Cited

U.S. PATENT DOCUMENTS

| | | | | |
|---|---|---|---|---|
| 2005/0099160 | A1* | 5/2005 | Asaumi | H02J 7/56 320/132 |
| 2006/0169519 | A1* | 8/2006 | Osonoi | B62D 1/163 180/402 |

(Continued)

FOREIGN PATENT DOCUMENTS

| | | | | |
|---|---|---|---|---|
| CN | 1796211 A | * | 7/2006 | B62D 5/003 |
| EP | 3592611 B1 | | 6/2021 | |

(Continued)

OTHER PUBLICATIONS

Translation of JP-2007001324-A (Year: 2007).*

(Continued)

*Primary Examiner* — Adam D Tissot
*Assistant Examiner* — Charles Pall
(74) *Attorney, Agent, or Firm* — Oliff PLC

(57) ABSTRACT

A steering control device includes a controller including a drive circuit that performs action for supplying, to a motor, electric power supplied by being connected to at least one of a first and a second power supply. When a connection state of the drive circuit is a state in which electric power is supplied from the first power supply, the connection state is switched by a power supply device to transition to a second state in which electric power is supplied from the second power supply when an abnormality of the first power supply is detected. Moreover, the controller starts an output limiting process of limiting torque outputtable by the motor as compared with before the abnormality of the first power supply is detected, after the abnormality is detected and before switching of the connection state is completed.

5 Claims, 7 Drawing Sheets

(56)          References Cited

U.S. PATENT DOCUMENTS

| | | | | |
|---|---|---|---|---|
| 2006/0190151 A1* | 8/2006 | Tsutsumi | | B62D 5/0457 |
| | | | | 701/41 |
| 2008/0234897 A1* | 9/2008 | Tsuchida | | B62D 5/046 |
| | | | | 701/42 |
| 2011/0066331 A1 | 3/2011 | Yamashita | | |
| 2011/0218704 A1* | 9/2011 | Kanekawa | | B62D 5/049 |
| | | | | 701/29.2 |
| 2011/0264326 A1* | 10/2011 | Iwasaki | | B62D 5/0481 |
| | | | | 701/41 |
| 2017/0015262 A1* | 1/2017 | Kikuchi | | B60R 16/033 |
| 2020/0031295 A1 | 1/2020 | Miller et al. | | |
| 2020/0283060 A1 | 9/2020 | Shinoda et al. | | |
| 2021/0066956 A1 | 3/2021 | Izawa et al. | | |
| 2022/0255343 A1* | 8/2022 | Mitani | | B60R 16/03 |
| 2022/0315099 A1* | 10/2022 | Maegawa | | H02P 29/028 |
| 2023/0001978 A1* | 1/2023 | Satou | | B60R 16/033 |
| 2023/0044665 A1* | 2/2023 | Watanabe | | B62D 5/006 |

FOREIGN PATENT DOCUMENTS

| | | | | |
|---|---|---|---|---|
| JP | 2007001324 A | * | 1/2007 | |
| JP | 2009-029196 A | | 2/2009 | |
| JP | 4853043 B2 | * | 1/2012 | B62D 5/04 |
| JP | 2015-205605 A | | 11/2015 | |
| JP | 2020083058 A | * | 6/2020 | B62D 5/04 |
| JP | 2020083059 A | * | 6/2020 | B62D 5/0463 |
| WO | 2011/073719 A1 | | 6/2011 | |
| WO | 2021/020357 A1 | | 2/2021 | |
| WO | WO-2022241800 A1 | * | 11/2022 | H02J 7/0063 |

OTHER PUBLICATIONS

English Translation of Zhang WO2022241800A1 Description (Year: 2025).*

Translation of JP2020083058A (Year: 2020).*

Translation of JP2020083059A (Year: 2020).*

Mar. 24, 2023 Search Report issued in European Patent Application No. 22202946.4.

Jul. 3, 2025 Office Action issued in European Patent Application No. 22202946.4.

Jan. 28 Office Action issued in European Patent Application No. 22202946.4.

* cited by examiner

| Vig1 | BACKUP SWITCHING COMPLETION FLAG | STATE OF POWER SUPPLY DEVICE | OUTPUT LIMIT VALUE |
|---|---|---|---|
| ≥ Vth | NOT INPUT | NORMAL | Imax |
| < Vth | NOT INPUT | TRANSITIONING | Imin |
| < Vth | INPUT | BACKUP | Ibu |

STEERING CONTROL DEVICE THAT LIMITS TORQUE OUTPUT BY A MOTOR

CROSS-REFERENCE TO RELATED APPLICATION

This application claims priority to Japanese Patent Application No. 2021-173729 filed on Oct. 25, 2021, incorporated herein by reference in its entirety.

BACKGROUND

1. Technical Field

The disclosure relates to a steering control device.

2. Description of Related Art

For example, a vehicle is equipped with a steering device disclosed in Japanese Unexamined Patent Application Publication No. 2020-83058 (JP 2020-83058 A). The steering device disclosed in JP 2020-83058 A is a so-called steer-by-wire kind steering device in which a power transmission path between a steering wheel of the vehicle and turning wheels of the vehicle is separated. The steering device includes a power supply device. The power supply device supplies electric power to components of the steering device, such as a reaction motor, a turning actuator, and a control device. The power supply device includes a main power supply and a backup power supply. The backup power supply is used as a backup when an abnormality occurs in the power supply device, which is the time when the main power supply malfunctions or fails.

Note that, there is a limit to the amount of electric power that the backup power supply can supply, and as a consequence, the steering device executes, for example, an output limiting process of executing control for limiting the output of the turning actuator during backup by the backup power supply. In this way, the steering device can continue to turn the turning wheels as much as possible through backup by the backup power supply when an abnormality occurs in the power supply device.

SUMMARY

In JP 2020-83058 A, the steering device is designed such that, even though turning of the turning wheels has to continue through backup by the backup power supply, the limit of the electric power that can be supplied by the backup power supply is not exceeded. Here, for the backup state by the backup power supply, there is a need for reducing the possibility of falling into a situation in which the output limiting process for the output of the turning actuator is not executed.

An aspect of the disclosure relates to a steering control device. The steering control device is connected to a first power supply mounted on a vehicle through a power supply device and that controls a steering device mounted on the vehicle, the power supply device including a second power supply. The steering control device includes a controller, the controller including a drive circuit that performs action for supplying, to a motor, electric power supplied by being connected to at least one of the first power supply and the second power supply, and the controller being configured to control an operation of the motor by controlling action of the drive circuit. In a case where a connection state of the drive circuit with respect to the first power supply and the second power supply is a first state when electric power is supplied from the first power supply, the connection state is switched by the power supply device to transition to a second state that is a state in which electric power is supplied from the second power supply when an abnormality of the first power supply is detected. The controller is configured to execute an output limiting process that is a process for limiting torque that is outputtable by the motor after the abnormality of the first power supply is detected as compared with before the abnormality is detected, and the output limiting process is started after the abnormality of the first power supply is detected and before switching of the connection state to the second state in response to detection of the abnormality is completed, the switching of the connection state being performed by the power supply device.

With the above configuration, the output limiting process has been already started by the controller when the power supply device completes the switching of the connection state to the second state in response to the detection of the abnormality of the first power supply. In this way, it is possible to suppress the occurrence of a situation in which the torque that can be output by the motor is not limited by the controller when the switching of the connection state by the power supply device is completed. Therefore, it is possible to reduce the possibility of to falling into the situation in which the torque that can be output by the motor is not limited when an abnormality of the power supply is detected.

In the steering control device according to the aspect described above, the output limiting process may be a process for limiting torque output by the motor such that the torque does not exceed an output limit value, and the output limit value may be a value less than a limit of a power supply performance of the second power supply defined by a power supply capacity or power supply voltage of the second power supply on a condition that the power supply performance of the second power supply is lower than a power supply performance of the first power supply.

With the above configuration, for the second state, it is possible to reduce the possibility of falling into a situation in which the power supply performance of the second power supply is exceeded. In this way, the operation of the motor can suitably continue even when an abnormality of the first power supply is detected. The effect is particularly observable when the power supply performance of the second power supply is lower than the power supply performance of the first power supply.

In the steering control device according to the aspect described above, the power supply device may include a power supply controller that is configured to switch the connection state such that the connection state transitions to the second state in response to the detection of the abnormality of the first power supply, and the controller may be configured to be connected to the power supply controller so as to be able to communicate with the power supply controller through a line, and configured to acquire, from the power supply controller through the line, information indicating that the switching of the connection state is completed in a case where the connection state transitions to the second state.

For the above configuration, the controller can determine the state of the power supply device, such as whether the state is the first state or the second state, based on the information acquired through the line from the power supply controller. In this way, the controller can operate in consideration of the state of the power supply device. Note that, a communication delay occurs in communication between the controller and the power supply controller. Causes of the communication delay include, for example, line paths or communication errors. As an example, an assumption is provided that the controller is configured to determine that the switching of the connection state to the second state is completed based on the information acquired from the power supply controller, and then start limiting the torque that can be output by the motor. In this case, during the communication delay, the switching of the connection state to the second state is completed; however, limiting of the torque that can be output by the motor by the controller is not started.

On the other hand, with the above configuration, when an abnormality of the first power supply is detected, the controller can start limiting the torque that can be output by the motor earlier than acquiring, from the power supply controller, the information indicating that the switching of the connection state to the second state is completed. Therefore, in the configuration in which the controller and the power supply controller communicate with each other, in the second state to which transition is made in response to the detection of the abnormality of the first power supply, it is possible to reduce the possibility of falling into the situation in which the torque that can be output by the motor is not limited.

Specifically, in the steering control device according to the aspect described above, the controller may be configured to execute the output limiting process while a power supply of the vehicle is in an on state allowing connection to the first power supply such that an operation of the vehicle is possible.

In the steering control device according to the aspect described above, the controller may include a control circuit that executes a process related to the output limiting process, and the control circuit may be configured to be connected to at least one of the first power supply and the second power supply, and be at all times connected to at least one of the first power supply and the second power supply through a connection circuit included in the power supply device while the power supply of the vehicle is in the on state, regardless of a state of the first power supply.

With the above configuration, when an abnormality of the first power supply is detected while the power supply of the vehicle is in the on state, electric power is continuously supplied to the control circuit included in the controller. In this case, the control circuit can suitably start the output limiting process when the first power supply fails.

With the steering control device of the disclosure, it is possible to reduce the possibility of falling into a situation in which the torque that can be output by the motor is not limited when an abnormality of the power supply is detected.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a block diagram particularly showing functions of a control circuit in a main controller of the turning-side controller;

FIG. 5 is a diagram illustrating a function of a limit controller among the functions of the control circuit;

DETAILED DESCRIPTION OF EMBODIMENTS

Figure 1:
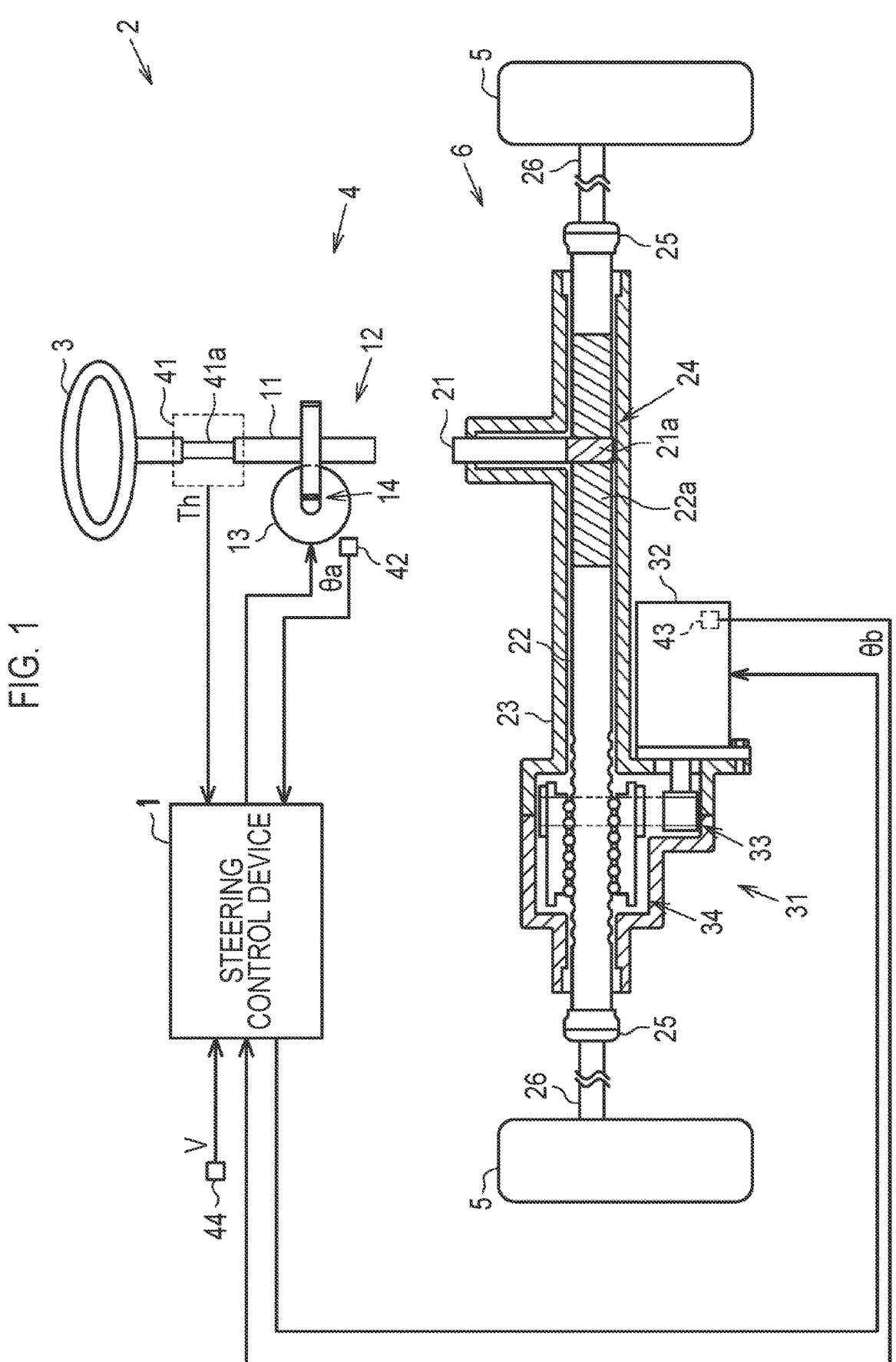
FIG. 1 is a diagram showing a schematic configuration of a steering device.

A steering control device 1 according to an embodiment will be described. As shown in FIG. 1, a steering device 2 to be controlled by the steering control device 1 is configured as a steer-by-wire kind steering device for a vehicle. The steering device 2 includes a steering section 4 and a turning section 6. The steering section 4 is steered by a driver through a steering wheel 3 of the vehicle. The turning section 6 turns right and left turning wheels 5 of the vehicle depending on the steering input to the steering section 4 by the driver. The steering device 2 of the present embodiment has a structure in which a power transmission path between the steering section 4 and the turning section 6 is mechanically separated at all times. That is, a power transmission path between the steering actuator 12, which will be described later, and a turning actuator 31, which will be described later, is mechanically separated at all times.

The steering section 4 includes a steering shaft 11 and the steering actuator 12. The steering shaft 11 is connected to the steering wheel 3. The steering actuator 12 has a steering-side motor 13 as a drive source and a steering-side speed reduction mechanism 14. The steering-side motor 13 is a reaction motor that applies a steering reaction force, which is a force against steering, to the steering wheel 3 through the steering shaft 11. The steering-side motor 13 is connected to the steering shaft 11 through the steering-side speed reduction mechanism 14 that formed of for example, a worm and wheel. For the steering-side motor 13 of the present embodiment, a three-phase brushless motor, for example, is employed.

The turning section 6 includes a pinion shaft 21, a rack shaft 22 as a turning shaft, and a rack housing 23. The pinion shaft 21 and the rack shaft 22 are connected with a predetermined crossing angle. A rack and pinion mechanism 24 is built by meshing pinion teeth 21a formed on the pinion shaft 21 and rack teeth 22a formed on the rack shaft 22. That is, the pinion shaft 21 corresponds to a rotating shaft that can be converted into a turning angle, which is the turning position of the turning wheel 5. The rack housing 23 accommodates the rack and pinion mechanism 24. One end of the pinion shaft 21 opposite to the end connected to the rack shaft 22 protrudes from the rack housing 23. In addition, both ends of the rack shaft 22 protrude from both ends of the rack housing 23 in an axial direction. Tie rods 26 are connected to both ends of the rack shaft 22 through rack ends 25 formed of ball joints. The distal ends of the tie rods 26 are connected to knuckles (not shown) to which the right and left turning wheels 5 are assembled.

The turning section 6 includes the turning actuator 31. The turning actuator 31 includes a turning-side motor 32 as a drive source, a transmission mechanism 33, and a conversion mechanism 34. The turning-side motor 32 applies a turning force for turning the turning wheels 5 to the rack shaft 22 through the transmission mechanism 33 and the conversion mechanism 34. The turning-side motor 32 transmits rotation to the conversion mechanism 34 through the transmission mechanism 33, which is made up of, for example, a belt transmission mechanism. The transmission mechanism 33 converts the rotation of the turning-side motor 32 into reciprocating motion of the rack shaft 22 through the conversion mechanism 34, which is made up of, for example, a ball screw mechanism. For the turning-side motor 32 of the present embodiment, a three-phase brushless motor, for example, is employed. In the present embodiment, the turning-side motor 32 is an example of the motor.

In the steering device 2 constructed as described above, the turning angle of the turning wheels 5 is changed by applying motor torque from the turning actuator 31 to the rack shaft 22 as the turning force, in response to the steering operation of the driver. In this case, the steering actuator 12 applies a steering reaction force against steering by the driver to the steering wheel 3. That is, in the steering device 2, a steering torque Th needed to steer the steering wheel 3 is changed by the steering reaction force, which is the motor torque applied from the steering actuator 12.

Incidentally, the reason for providing the pinion shaft 21 is to support the rack shaft 22 together with the pinion shaft 21 inside the rack housing 23. That is, via a support mechanism (not shown) provided in the steering device 2, the rack shaft 22 is movably supported along the axial direction, and is pressed toward the pinion shaft 21. In this way, the rack shaft 22 is supported inside the rack housing 23. Note that, another support mechanism may be provided that supports the rack shaft 22 on the rack housing 23 without using the pinion shaft 21.

As shown in FIG. 1, the steering-side motor 13 and the turning-side motor 32 are connected to the steering control device 1. The steering control device 1 controls the operation of the motors 13, 32. In this way, the steering control device 1 controls the steering device 2 to operate to exhibit a desired function as a steer-by-wire kind steering device.

Detection results of various sensors are input to the steering control device 1. Various sensors include, for example, a torque sensor 41, a steering-side rotation angle sensor 42, a turning-side rotation angle sensor 43, and a vehicle speed sensor 44.

The torque sensor 41 is provided at a portion of the steering shaft 11 that is closer to the steering wheel 3 than the steering-side speed reduction mechanism 14. The torque sensor 41 detects the steering torque Th, which is a value indicating torque applied to the steering shaft 11 by the steering operation of the driver. The steering torque Th is detected in relation to torsion of a torsion bar 41a provided in the middle of the steering shaft 11. The steering-side rotation angle sensor 42 is provided in the steering-side motor 13. The steering-side rotation angle sensor 42 detects a rotation angle θa, which is the angle of the rotating shaft of the steering-side motor 13, within a range of 360 degrees. The turning-side rotation angle sensor 43 is provided in the turning-side motor 32. The turning-side rotation angle sensor 43 detects a rotation angle θb, which is the angle of the rotating shaft of the turning-side motor 32, within a range of 360 degrees. The vehicle speed sensor 44 detects a vehicle speed V, which is a traveling speed of the vehicle.

Electrical Configuration of Steering Control Device 1

Figure 2:
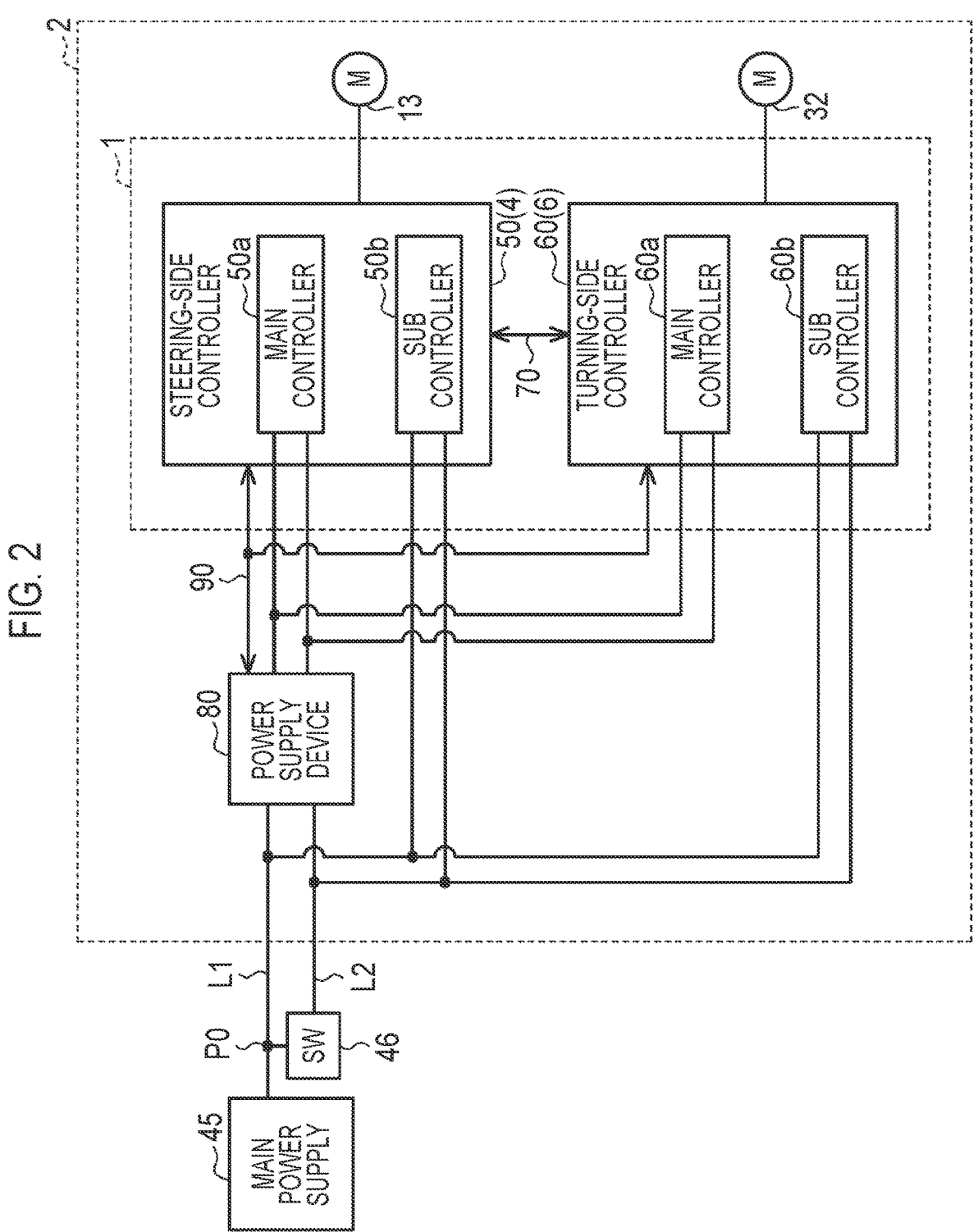
FIG. 2 is a block diagram showing an electrical configuration of the steering device.

As shown in FIG. 2, the steering control device 1 includes a steering-side controller 50 that controls electric power supply to the steering-side motor 13 and a turning-side controller 60 that controls electric power supply to the turning-side motor 32. The steering-side controller 50 and the turning-side controller 60 mutually transmit and receive information through a local network 70 such as serial communication. The steering-side controller 50 is provided as a part of the configuration of the steering section 4. Further, the turning-side controller 60 is provided as a part of the configuration of the turning section 6.

The steering-side controller 50 includes a central processing unit (CPU) and a memory (not shown), and the CPU executes a program stored in the memory at predetermined calculation cycles. In this way, various processes are executed. The calculation cycle of the steering-side controller 50 may be set in consideration of a calculation cycle of a power supply controller 88 to be described later or a communication period of a dedicated signal line 90 to be described later. For example, the calculation cycle of the steering-side controller 50 is designed to be smaller than each of the calculation cycle of the power supply controller 88 to be described later or the communication period of the dedicated signal line 90 to be described later.

As a control system formed by combining a CPU and a memory to execute various kinds of processes, the steering-side controller 50 is configured to have two systems, a main controller 50a and a sub controller 50b. In the present embodiment, the steering-side controller 50 operates in a master-slave control method in which the main controller 50a is a master controller and the sub controller 50b is a slave controller. The same applies to the turning-side controller 60. That is, as a controller formed by combining a CPU and a memory to execute various kinds of processes, the turning-side controller 60 is configured to have two systems, a main controller 60a and a sub controller 60b, and operate the two controllers in the master-slave control method. The controllers 50a, 50b of the steering-side controller 50 and the controllers 60a, 60b of the turning-side controller 60 are configured to be able to communicate with each other through the local network 70.

Each of the controllers 50a, 50b of the steering-side controller 50 calculates a reaction force control amount, which is a target steering reaction force of the steering wheel 3 to be generated through the steering-side motor 13, based on various information. The various information includes, for example, detection results of the various sensors described above and information obtained from the turning-side controller 60 through the local network 70. Each of the controllers 50a, 50b controls electric power supply to the steering-side motor 13 based on the reaction force control amount. Further, each of the controllers 60a, 60b of the turning-side controller 60 calculates a turning control amount, which is a target turning force to be generated through the turning-side motor 32, based on various information. The various information includes, for example, detection results of the various sensors described above and information obtained from the steering-side controller 50 through the local network 70. Each of the controllers 60a, 60b controls electric power supply to the turning-side motor 32 based on the turning control amount.

A main power supply 45 as a first power supply is connected to the steering control device 1, that is, the steering device 2. The main power supply 45 is, for example, a secondary battery mounted on the vehicle. The main power supply 45 serves as a power source for electric power supplied to operate the motors 13, 32 and also serves as a power source for electric power supplied to operate the steering control device 1, that is, the steering device 2.

A vehicle start switch 46 such as an ignition switch is provided between the steering device 2 and the main power supply 45. Among two power supply lines L1, L2 connecting the steering device 2 to the main power supply 45, the start switch 46 is provided in the middle of the power supply line L2 branching from a connection point PO of the power supply line L1. The start switch 46 is operated to start various functions such that the vehicle can operate by activating a drive source for vehicle traveling such as an engine. Through the operation of the start switch 46, the power supply line L2 is turned into a conducting state or non-conducting state. In the present embodiment, the operating state of the steering device 2 that can exhibit the desired function as a steer-by-wire kind steering device is associated with the operating state of the vehicle. Although the power supply line L1 is basically in the conducting state at all times, the power supply line L1 is turned into the conducting or non-conducting state indirectly as a function of the steering device 2 depending on the operating state of the steering device 2. That is, the operating state of the steering device 2 is associated with whether or not each of the power supply lines L1, L2 is in the conducting state, which is the state of electric power supply from the main power supply 45.

In the steering device 2, each of the power supply lines L1, L2, that is, the main power supply 45 is connected to the steering-side controller 50, particularly, the main controller 50a, through a power supply device 80. Further, each of the power supply lines L1, L2, that is, the main power supply 45 is directly connected to the steering-side controller 50, particularly, the sub controller 50b without the power supply device 80 interposed therebetween. The same applies to the turning-side controller 60, and each of the power supply lines L1, L2, that is, the main power supply 45, is connected to the turning-side controller 60, particularly, the main controller 60a through the power supply device 80. Further, each of the power supply lines L1, L2, that is, the main power supply 45 is directly connected to the turning-side controller 60, particularly, the sub controller 60b without the power supply device 80 interposed therebetween. That is, in the present embodiment, the steering-side controller 50 and the turning-side controller 60 are configured to share the single power supply device 80. The power supply device 80 is configured to be able to communicate with the main controllers 50a, 60a of the steering-side controller 50 and the turning-side controller 60 through the dedicated signal line 90.

Connection of Power Supply Lines L1, L2

Figure 3:
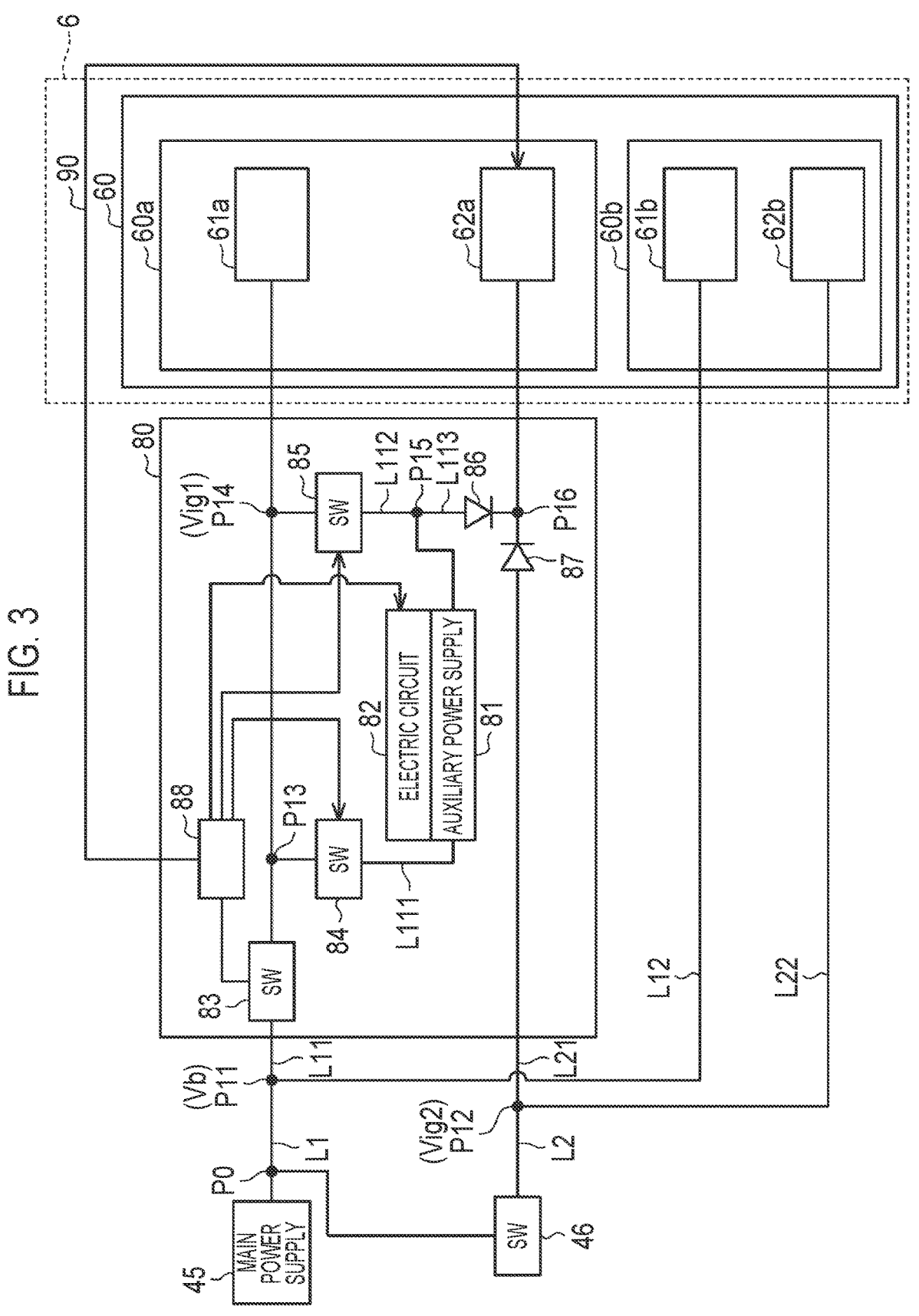
FIG. 3 is a block diagram particularly showing an electrical configuration of a turning-side controller in the electrical configuration of the steering device.

FIG. 3 shows in detail a configuration for electric power supply. Here, a configuration related to the turning-side controller 60 will be mainly described. A configuration related to the steering-side controller 50 is basically the same as the configuration related to the turning-side controller 60.

As shown in FIG. 3, the electric power of the main power supply 45 is supplied to a drive circuit 61a of the main controller 60a through a power supply line L11 branched from a connection point P11 of the power supply line L1. The drive circuit 61a is a circuit that handles larger electric power, and includes, for example, an inverter that converts direct current electric power of the main power supply 45 into alternate current electric power. The electric power of the main power supply 45 is supplied to a control circuit 62a of the main controller 60a through a power supply line L21 branched from a connection point P12 of the power supply line L2. The control circuit 62a is a circuit for controlling the steering-side motor 13, and includes, for example, a CPU and a memory.

Further, the electric power of the main power supply 45 is supplied to a drive circuit 61b of the sub controller 60b through a power supply line L12 branched from the connection point P11 of the power supply line L1. The drive circuit 61b has the same configuration as the drive circuit 61a. The electric power of the main power supply 45 is supplied to a control circuit 62b of the sub controller 60b through a power supply line L22 branched from the connection point P12 of the power supply line L2. The control circuit 62b has the same configuration as the control circuit 62a.

The steering-side controller 50 has a configuration corresponding to the configuration of the turning-side controller 60. That is, in the steering-side controller 50, the main controller 50a has components corresponding to the drive circuit 61a and the control circuit 62a. In the steering-side controller 50, the sub controller 50b has components corresponding to the drive circuit 61b and the control circuit 62b.

Construction of Power Supply Device 80

As shown in FIG. 3, the power supply device 80 includes an auxiliary power supply 81 as a second power supply, an electric circuit 82, switches 83, 84, 85, diodes 86, 87, and a power supply controller 88.

The auxiliary power supply 81 is, for example, a capacitor that functions like a secondary battery. The auxiliary power supply 81 serves as a power source for electric power supplied to operate the turning-side motor 32 and also serves as a power source for electric power supplied to operate the turning-side controller 60. The same applies to the steering section 4, and the auxiliary power supply 81 serves as a power source for electric power supplied to the steering-side motor 13 and also serves as a power source for electric power supplied to the steering-side controller 50. The main power supply 45 and the auxiliary power supply 81 differ in power supply performance related to the performance of electric power that can be supplied. The auxiliary power supply 81 is set to be smaller than the main power supply 45 in terms of a power supply capacity, which is the charge amount that can be stored to supply electric power. The auxiliary power supply 81 is set to be smaller than the main power supply 45 in terms of a power supply voltage, which is a voltage used when electric power is supplied. That is, the power supply performance of the auxiliary power supply 81 is configured to be lower than the power supply performance of the main power supply 45.

As represented by the following equation (A), a power supply voltage V2 of the auxiliary power supply 81 is set to have a value higher than a voltage V0 needed to properly operate the motors 13, 32 or the controllers 50, 60, and lower than a power supply voltage V1 of the main power supply 45.

$$V1 > V2 > V0 \tag{A}$$

Inside the power supply device 80, the auxiliary power supply 81 is connected to the connection point P11 of the power supply line L11 through a power supply line L111 branched from a connection point P13 of the power supply line L11. Further, inside the power supply device 80, the auxiliary power supply 81 is connected to the connection point P11 of the power supply line L11 through a power supply line L112 branched from a connection point P14 of the power supply line L11. Note that, the connection point P14 is located downstream, meaning that the connection point P14 is located closer to the turning-side controller 60 than the connection point P13. The auxiliary power supply 81 functions to assist electric power supply to the turning-side controller 60 according to the state of electric power supply from the main power supply 45. In the present embodiment, the auxiliary power supply 81 has a function of backing up electric power supply to the turning-side controller 60 in place of the main power supply 45 on the condition that the electric power supplied by the main power supply 45 drops. The same applies to the steering-side controller 50. That is, the auxiliary power supply 81 has a function of backing up electric power supply to the steering-side controller 50 in place of the main power supply 45 on the condition that the electric power supplied by the main power supply 45 drops.

The electric circuit 82 switches the connection state to the power supply line L11 such that the auxiliary power supply 81 is charged and discharged. Further, the electric circuit 82 switches the connection state to the power supply line L11 to disconnect the auxiliary power supply 81 such that electric charge is not discharged from the auxiliary power supply 81.

The switch 83 is provided in the middle of the power supply line L11 inside the power supply device 80. The switch 83 is located upstream, meaning that the switch 83 is located closer to the main power supply 45 than the connection point P13. The switch 83 opens and closes the power supply line L11.

The switch 84 is provided in the middle of the power supply line L111 inside the power supply device 80. The switch 84 opens and closes the power supply line L111. The switch 85 is provided in the middle of the power supply line L112 inside the power supply device 80. The switch 85 opens and closes the power supply line L112.

A connection point P15 is set on the power supply line L112. Inside the power supply device 80, the connection point P15 of the power supply line L112 and a connection point P16 of the power supply line L21 are connected by a power supply line L113.

The diode 86 is provided in the middle of power supply line L113. The cathode of the diode 86 is connected to the connection point P16 of the power supply line L21. The anode of the diode 86 is connected to the connection point P15 of the power supply line L113.

The diode 87 is provided in the middle of power supply line L21. The cathode of the diode 87 is connected to the connection point P16 of the power supply line L21. The anode of the diode 87 is connected to the connection point P12 of the power supply line L21.

The diodes 86, 87 allow flow of electric power from the anodes to the cathodes, and restrict flow of electric power from the cathodes to the anodes. The diodes 86, 87 form an OR circuit that supplies the control circuit 62a with the electric power of the main power supply 45 or the auxiliary power supply 81, whichever has a higher supply voltage. The OR circuit formed of the diodes 86, 87 is a so-called wired OR. The OR circuit formed of diodes 86, 87 corresponds to a selection circuit that selects the electric power of the main power supply 45 or the auxiliary power supply 81, whichever has a higher supply voltage, in order to supply electric power to the turning-side controller 60. In the present embodiment, the OR circuit is an example of a connection circuit.

Function of Power Supply Controller 88

The power supply controller 88 includes a central processing unit (CPU) and a memory (not shown), and the CPU executes one or more programs stored in the memory at predetermined calculation cycles. In this way, various processes are executed.

Specifically, the power supply controller 88 controls switching of the connection state of the electric circuit 82 and controls opening and closing of the switches 83, 84, 85. The power supply controller 88 monitors the voltage of the main power supply 45. The power supply controller 88 has a function of detecting the voltage of the electric power supplied to the power supply device 80 through the power supply line L11 as a power supply voltage Vb of the main power supply 45. The power supply voltage Vb is a power supply voltage at the connection point P11 of the power supply line L11. As represented by the following equation (B), when the power supply voltage Vb of the main power supply 45 is lower than a threshold voltage Vth, the power supply controller 88 determines that the power supply voltage Vb of the main power supply 45 drops. The threshold voltage Vth is a reference for determining the voltage drop of the main power supply 45, and is set based on the voltage V0 needed to properly operate the motors 13, 32 or the controllers 50, 60. In the present embodiment, the threshold voltage Vth is set to the same value as the voltage V0.

$$Vb < Vth \tag{B}$$

When the voltage drop of the main power supply 45 is not detected, the power supply controller 88 maintains the switches 83, 84 in the closed state in which the switches are turned on and the switch 85 in the open state in which switch is turned off. Further, when the voltage drop of the main power supply 45 is detected, the power supply controller 88 switches the switches 83, 84 from the closed state in which the switches are turned on, to the open state in which the switches are turned off. Then, the power supply controller 88 switches the switch 85 from the open state in which the switch is turned off, to the closed state in which the switch is turned on.

Specifically, when the power supply voltage Vb of the main power supply 45 does not drop, the switches 83 and 84 are maintained in the closed state in which the switches are turned on, and the switch 85 is maintained in the open state in which the switch is turned off. For example, for the turning section 6, the electric power from the main power supply 45 is supplied to the drive circuit 61a in the turning-side controller 60 through the power supply line L11. The auxiliary power supply 81 is charged by the electric power from the main power supply 45 through the power supply line L111.

In the case that the power supply voltage Vb of the main power supply 45 does not drop, when the start switch 46 is turned on, the electric power of the main power supply 45 is supplied to the control circuit 62a in the turning-side controller 60 through the power supply line L21. Incidentally, since the power supply voltage Vb of the main power supply 45 is set to the power supply voltage V1 which is higher than the power supply voltage V2 of the auxiliary power supply 81, basically, the electric power of the auxiliary power supply 81 is not supplied to the turning-side controller 60 through the power supply line L113 and a part of the power supply line L21. In addition, the diode 86 restricts the flow of the electric power of the main power supply 45 that has passed through the power supply line L21 into the auxiliary power supply 81 through the power supply line L113.

When an abnormality of the main power supply 45, such as malfunction or failure, occurs and the power supply voltage Vb of the main power supply 45 falls below the power supply voltage V2 of the auxiliary power supply 81, the electric power from the auxiliary power supply 81 is immediately supplied to the control circuit 62a in the turning-side controller 60 through the power supply line L113 and a part of the power supply line L21. The reason is that the power supply voltage V2 of the auxiliary power supply 81 becomes higher than a voltage generated on the power supply line L2. Even when electric power supply from the main power supply 45 to the turning-side controller 60 is interrupted due to a failure of the main power supply 45, electric power supply to the control circuit 62a is backed up by the auxiliary power supply 81.

When the power supply voltage Vb of the main power supply 45 further drops and the power supply voltage Vb of the main power supply 45 falls below the threshold voltage Vth, the switches 83, 84 are switched from the closed state in which the switches are turned on to the open state in which the switches are turned off. Then, the open state in which the switch 85 is turned off is switched to the closed state in which the switch is turned on. In this way, the electric power of the auxiliary power supply 81 is supplied to the drive circuit 61a in the turning-side controller 60 through the power supply line L112 and a part of the power supply line L11. The reason is that the power supply voltage V2 of the auxiliary power supply 81 becomes higher than a voltage generated on the power supply line L11 due to the failure of the main power supply 45. Therefore, even when electric power supply from the main power supply 45 to the turning-side controller 60 is interrupted due to the failure of the main power supply 45, electric power supply to the drive circuit 61a in the turning-side controller 60 is backed up by the auxiliary power supply 81.

In this case, the power supply controller 88 generates a backup switching completion flag FLG as information indicating completion of switching to the state in which electric power supply is backed up by the auxiliary power supply 81. Subsequently, the power supply controller 88 outputs the backup switching completion flag FLG to the turning-side controller 60, that is, the main controller 60a through the dedicated signal line 90. The backup switching completion flag FLG is information indicating completion of the switching of the switches 83, 84 from the closed state in which the switches 83, 84 are turned on to the open state in which the switches 83, 84 are turned off and the switching of the switch 85 from the open state in which the switch 85 is turned off to the closed state in which the switch 85 is turned on, due to the failure of the main power supply 45. In this way, the turning-side controller 60 can determine that the state of the power supply device 80 is a state in which electric power supply is backed up by the auxiliary power supply 81.

Incidentally, it is conceivable to provide a diode instead of the switch 85 on the power supply line L112. In this way, when the main power supply 45 fails, the electric power of the auxiliary power supply 81 is immediately supplied to the drive circuit 61a. However, the diode generates electric power loss. Therefore, from the viewpoint of suppressing consumption of the auxiliary power supply 81, the switch 85 is provided instead of a diode on the power supply line L112 for supplying electric power to the drive circuit 61a that needs larger power.

It is also conceivable to provide a switch instead of the diode 86 on the power supply line L113. However, in this case, there are concerns about the following. That is, it takes a little time from a time when the electric power supply from the main power supply 45 is interrupted due to a failure of the main power supply 45 to a time when the switch of the power supply line L113 is switched from off to on. Therefore, during the period until the switch of the power supply line L113 is switched from off to on, there is a possibility that the control circuit 62a may be reset due to momentary interruption of electric power supply to the control circuit 62a. In this respect, when the diode 86 is provided on the power supply line L113, the electric power from the auxiliary power supply 81 is immediately supplied to the control circuit 62a through the power supply line L113 and a part of the power supply line L21 when the main power supply 45 fails. Since the electric power supply to the control circuit 62a is not interrupted, the control circuit 62a is not reset due to a drop in the power supply voltage.

Then, in the turning-side controller 60, the control circuit 62a monitors the voltage of the main power supply 45. The control circuit 62a has a function of detecting the voltage of the electric power supplied to the drive circuit 61a through the power supply line L11 as a power supply voltage Vig1 of the main power supply 45. The power supply voltage Vig1 is a power supply voltage at the connection point P14 of the power supply line L11. Further, the control circuit 62b monitors the voltage of the main power supply 45. The control circuit 62b has a function of detecting the voltage of the electric power supplied through the power supply line L22 as a power supply voltage Vig2 of the main power supply 45. The power supply voltage Vig2 is a power supply voltage at the connection point P12 of the power supply line L21. Similarly, a control circuit 52b included in the main controller 50a of the steering-side controller 50 having the same configuration as the turning-side controller 60 has a function of detecting, as the power supply voltage of the main power supply 45, the voltage of the supplied electric power supplied to a drive circuit 51a through a power supply line corresponding to the power supply line L11. Further, the control circuit 52b included in the sub controller 50b of the steering-side controller 50 has a function of detecting the voltage of the electric power supplied through a power supply line corresponding to the power supply line L22 as the power supply voltage of the main power supply 45.

Functions of Main Controller 60a of Turning-Side Controller 60

Figure 4:
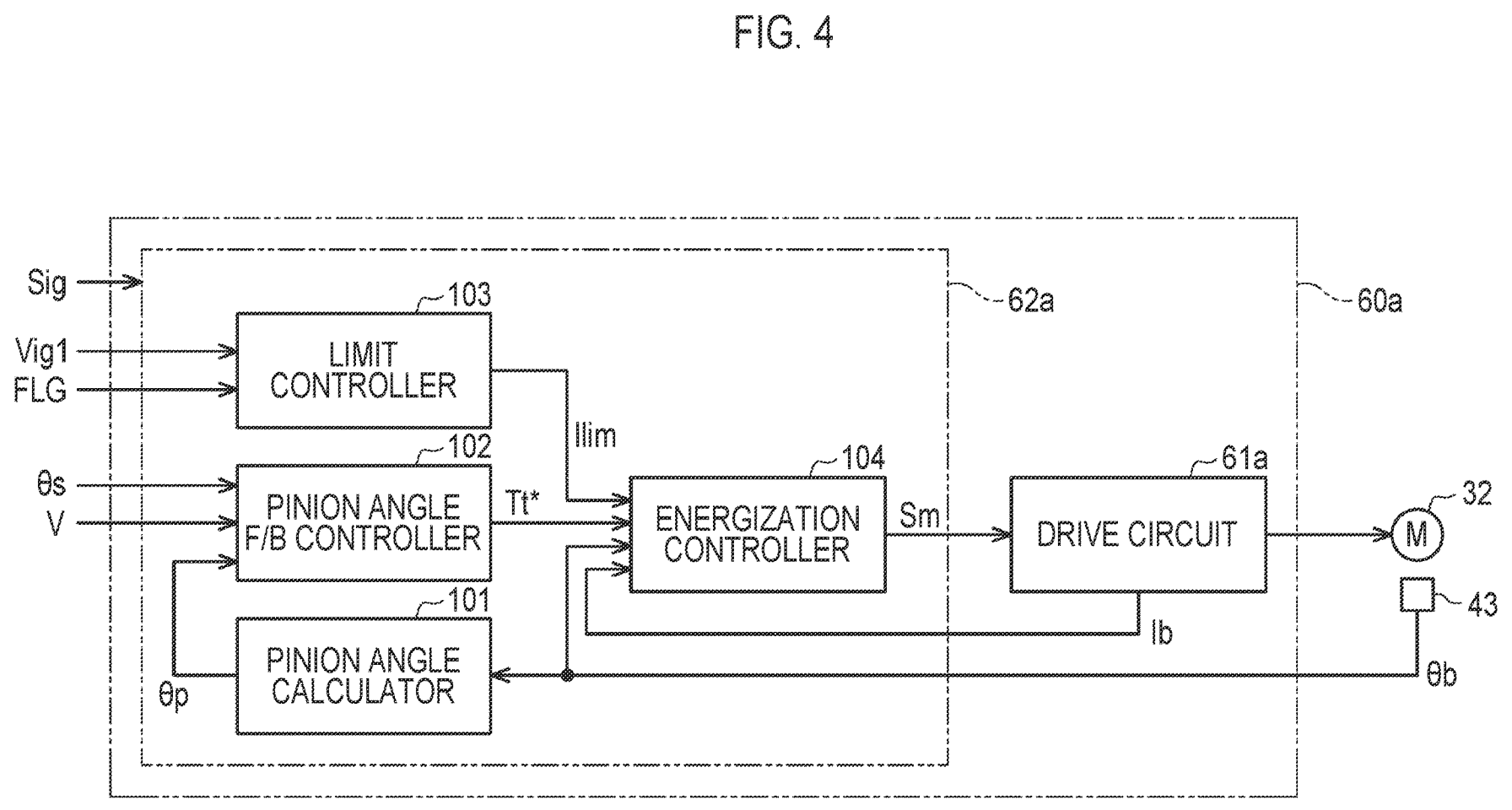

FIG. 4 shows some of processes executed by the control circuit 62a for the main controller 60a of the turning-side controller 60. The processes shown in FIG. 4 illustrate each kind of processes among processes carried out by the CPU executing a program stored in the memory. In the present embodiment, the turning-side controller 60, that is, the main controller 60a is an example of a controller.

As shown in FIG. 4, a start signal Sig is input to the control circuit 62a. The start signal Sig is a signal indicating the on/off state of the start switch 46. When a determination is made that the start switch 46 is in the off state based on the start signal Sig, the control circuit 62a stops the control for operating the turning-side motor 32. That is, when the start switch 46 is in the off state, the turning-side controller 60 cannot reflect the state of the steering section 4 in the separated state to the state of the turning section 6.

On the other hand, when a determination is made that the start switch 46 is in the on state based on the start signal Sig, the control circuit 62a executes the control for operating the turning-side motor 32. That is, when the start switch 46 is in the on state, the control circuit 62a executes turning-side control of the steer-by-wire kind steering device 2 at the time of being energized such that the state of the steering section 4 in the separated state is reflected in the state of the turning section 6. In this case, the control circuit 62a executes operations described below.

Normal Turning-Side Control

Specifically, the vehicle speed V, a rotation angle θb, a turning-side actual current value Ib, a steering angle θs, the power supply voltage Vig1, and the backup switching completion flag FLG are input to the control circuit 62a. The turning-side actual current value Ib is information obtained from the drive circuit 61*a*. The drive circuit 61*a* includes a current sensor (not shown). The current sensor detects the turning-side actual current value Ib obtained from a current value of each of phases of the turning-side motor 32 flowing through a connection line between the drive circuit 61*a* and a motor coil of each phase of the turning-side motor 32. The current sensor acquires, as a current, the voltage drop of a shunt resistor connected to a source side of each switching element in the inverter included in the drive circuit 61*a* provided corresponding to the turning-side motor 32. The steering angle θs is information obtained from the steering-side controller 50 through the local network 70. The steering-side controller 50 converts the rotation angle θa into an integrated angle including a range exceeding 360 degrees, for example, by counting the number of revolutions of the steering-side motor 13 from a steering neutral position, which is the position of the steering wheel 3 when the vehicle is traveling straight. The steering-side controller 50 calculates the steering angle θs by multiplying the integrated angle obtained by the conversion by a conversion factor based on a rotation speed ratio of the steering-side speed reduction mechanism 14. The control circuit 62*a* controls driving of the drive circuit 61*a* based on the vehicle speed V, the rotation angle θb, the turning-side actual current value Ib, the steering angle θs, the power supply voltage Vig1, and the backup switching completion flag FLG.

The control circuit 62*a* includes a pinion angle calculator 101, a pinion angle feedback controller ("pinion angle FB controller" in the FIG. 102, a limit controller 103, and an energization controller 104.

A rotation angle θb is input to the pinion angle calculator 101. The pinion angle calculator 101 converts the rotation angle θb into an integrated angle including a range exceeding 360 degrees, for example, by counting the number of revolutions of the turning-side motor 32 from a rack neutral position, which is the position of the rack shaft 22 when the vehicle is traveling straight. The pinion angle calculator 101 calculates a pinion angle θp, which is the actual rotation angle of the pinion shaft 21, by multiplying the integrated angle obtained by conversion by a conversion factor based on a rotation speed ratio of the transmission mechanism 33, a lead of the conversion mechanism 34, and a rotation speed ratio of the rack and pinion mechanism 24. The pinion angle θp thus obtained is output to the pinion angle feedback controller 102. It is to be noted that the pinion angle θp may be output to the steering-side controller 50 in some cases.

The vehicle speed V, the steering angle θs, and the pinion angle θp are input to the pinion angle feedback controller 102. The pinion angle feedback controller 102 calculates a turning force command value Tt*, which is a turning control amount, through feedback control of the pinion angle θp such that the pinion angle θp follows the steering angle θs, which is a pinion target angle θp*. The turning force command value Tt* thus obtained is output to the energization controller 104.

The power supply voltage Vig1 and the backup switching completion flag FLG are input to the limit controller 103. The limit controller 103 calculates an output limit value Ilim based on the power supply voltage Vig1 and the backup switching completion flag FLG. The output limit value Ilim is a value for limiting the amount of current supplied to the turning-side motor 32. That is, the output limit value Ilim is a value for limiting the torque to be output to the turning-side motor 32. The output limit value Ilim is calculated to vary according to the voltage of the main power supply 45, that is, the state of the power supply device 80. The output limit value Ilim thus obtained is output to the energization controller 104.

The turning force command value Tt*, the rotation angle θb, the turning-side actual current value Ib, and the output limit value Ilim are input to the energization controller 104. The energization controller 104 calculates a current command value Ib* for the turning-side motor 32 based on the turning force command value Tt*. The energization controller 104 executes a limiting process for limiting the current command value Ib* based on the output limit value Ilim. In this case, the energization controller 104 compares the current command value Ib* with the output limit value Ilim. When the absolute value of the current command value Ib* exceeds the output limit value Ilim, the energization controller 104 calculates a value obtained by limiting the current command value Ib* to the output limit value Ilim, instead of the current command value Ib*, as the final current command value Ib*. Further, when the absolute value of the current command value Ib* is equal to or less than the output limit value Ilim, the energization controller 104 calculates a value obtained by the calculation based on the turning force command value Tt* as the final current command value Ib*.

Then, the energization controller 104 obtains a deviation between the final current command value Ib* and a current value on dq coordinates obtained by converting the turning-side actual current value Ib based on the rotation angle θb, and calculates a drive signal Sm for driving the drive circuit 61*a* to eliminate the deviation. The drive signal Sm is a gate on/off signal that defines the on/off state of each switching element of the inverter included in the drive circuit 61*a*. The drive signal Sm thus obtained is output to the drive circuit 61*a*. In this way, the turning-side motor 32 is supplied with drive electric power according to the drive signal Sm from the drive circuit 61*a*. Then, the turning-side motor 32 rotates by an angle according to the turning force command value Tt*.

Function of Limit Controller 103

The limit controller 103 monitors the voltage of the main power supply 45 for the normal turning-side control. When the power supply voltage Vig1 detected as the power supply voltage of the main power supply 45 is smaller than the threshold voltage Vth, as represented by the following equation (C), the limit controller 103 determines that the power supply voltage Vb of the main power supply 45 drops. The threshold voltage Vth has the same value as the threshold voltage Vth in the above equation (B), that is, the same value as the voltage V0.

$$\text{Vig1} < \text{Vth} \tag{C}$$

When the voltage drop of the main power supply 45 is not detected, the limit controller 103 determines that the power supply device 80 is in a normal state as a first state in which electric power is supplied from the main power supply 45. In the power supply device 80, the normal state means a state in which the switches 83, 84 are switched to the closed state in which the switches are turned on and the switch 85 is switched to the open state in which the switch is turned off.

Further, while the backup switching completion flag FLG is not input after the voltage drop of the main power supply 45 is detected, the limit controller 103 determines that the state of the power supply device 80 is a transitioning state before the transition to the backup state is completed. In the power supply device 80, the backup transitioning state means a state in which the switches 83, 84 are switched from the closed state in which the switches are turned on to the open state in which the switches are turned off, and then the switch 85 is in the middle of being switched from the open state in which the switch is turned off to the closed state in which the switch is turned on.

Further, when the backup switching completion flag FLG is input after the voltage drop of the main power supply 45 is detected, the limit controller 103 determines that the state of the power supply device 80 is a state in the transition to the backup state, which is a second state, is completed. In the power supply device 80, the state in which the transition to the backup state is completed means that a state in which the switches 83, 84 are switched from the closed state in which the switches are turned on to the open state in which the switches are turned off, and the switch 85 is switched from the open state in which the switch is turned off, to the closed state in which the switch is turned on.

After the voltage drop of the main power supply 45 is detected, in the limit controller 103, it takes some time until the backup switching completion flag FLG indicating that the switching of the state of the power supply device 80 to the state in which electric power supply is backed up by the auxiliary power supply 81 is completed is input. The reason is that, in the communication of the dedicated signal line 90, a communication delay occurs due to, for example, the line path or communication error. With respect to the cause, it takes some time until the backup switching completion flag FLG output by the power supply controller 88 is input to the turning-side controller 60 (for example, in (c) of FIG. 6, "COMMUNICATION PERIOD"). Another cause is that in the power supply controller 88, processes related to switching of the switches 83, 84, 85 are executed over a plurality of calculation cycles. With respect to the cause, in the power supply device 80, it takes some time until the switching of the switches 83, 84, 85 is completed (for example, "APPROXIMATELY SEVERAL TENS OF ms" in (a) of FIG. 6). Therefore, for the backup switching completion flag FLG, for example, there is a timing difference between the input and output by "APPROXIMATELY SEVERAL TENS OF ms" and "COMMUNICATION PERIOD". The limit controller 103 is configured to, when determining the state of the power supply device 80, take into consideration the timing difference between the input and output of the backup switching completion flag FLG.

Then, as shown in FIG. 5, the limit controller 103 calculates the output limit value Ilim according to the state of the power supply device 80, which can be determined in consideration of the timing difference between the input and output of the backup switching completion flag FLG. The limit controller 103 determines that power supply device 80 is in the normal state when the power supply voltage Vig1 is equal to or higher than the threshold voltage Vth. In this case, the limit controller 103 calculates a maximum value Imax as the output limit value Ilim. The maximum value Imax is set to a limit value of torque that can be output by the turning-side motor 32, for example, to a rated current value. That is, the main controller 60a executes a normal output limiting process that allows the turning-side motor 32 to generate torque up to the output limit through the function of the control circuit 62a.

Further, when the power supply voltage Vig1 is less than the threshold voltage Vth and the backup switching completion flag FLG is not input, the limit controller 103 determines that the power supply device 80 is in the backup transitioning state. In this case, the limit controller 103 calculates a minimum value Imin as the output limit value Ilim. The minimum value Imin is a value smaller than the maximum value Imax. From the viewpoint of the amount of current that can be supplied to the turning-side motor 32 when the main power supply 45 fails, the minimum value Imin is set to a relatively small value within a range below the limit of the power supply performance of the auxiliary power supply 81. That is, the main controller 60a executes an output limiting process at the time of backup transitioning that limits the torque that can be output by the turning-side motor 32 as compared with before a failure of the main power supply 45, through the function of the control circuit 62a.

Further, when the power supply voltage Vig1 is less than the threshold voltage Vth and the input of the backup switching completion flag FLG is completed, the limit controller 103 determines that the power supply device 80 is in the state in which transition of the power supply device 80 to the backup state is completed. In this case, the limit controller 103 calculates a during-backup limit value Ibu as the output limit value Ilim. The during-backup limit value Ibu is smaller than the maximum value Imax and larger than the minimum value Imin. From the viewpoint of the amount of current that can be supplied to the turning-side motor 32 when the main power supply 45 fails, the during-backup limit value Ibu is set to a value in a range larger than the minimum value Imin among values in the range below the limit of the power supply performance of the auxiliary power supply 81. That is, the main controller 60a executes an output limiting process during the backup that allows the generation of as much torque as possible while the torque that can be output by the turning-side motor 32 is limited compared to before the failure of the main power supply 45, through the function of the control circuit 62a. For example, the limit controller 103 calculates, as the during-backup limit value Ibu, an appropriate value according to the state of the steering device 2, such as the internal temperature of the steering control device 1, the operating state of the turning-side motor 32, and the remaining electric power of the auxiliary power supply 81.

Regarding the sub controller 60b of the turning-side controller 60, the control circuit 62b stops the control for operating the turning-side motor 32 when the main power supply 45 fails, even when the start switch 46 is in the on state. The reason is that the sub controller 60b is not connected to the auxiliary power supply 81 of the power supply device 80. That is, the control circuit 62b executes the same process as the control circuit 62a when the normal turning-side control is executed while the main power supply 45 does not fail. Further, the main controller 50a of the steering-side controller 50 is connected to the auxiliary power supply 81 of the power supply device 80 in the same manner as the main controller 60a of the turning-side controller 60. That is, the main controller 50a may have a configuration with a limit controller having the same function as the main controller 60a, or may have a configuration without the limit controller. Further, the sub controller 50b of the steering-side controller 50 is not connected to the auxiliary power supply 81 of the power supply device 80, in the same manner as the sub controller 60b of the turning-side controller 60. That is, the sub controller 50b may have any configuration that executes the same process as the process executed by the main controller 50a while the main power supply 45 does not fail.

Operation of Present Embodiment

Figure 6:
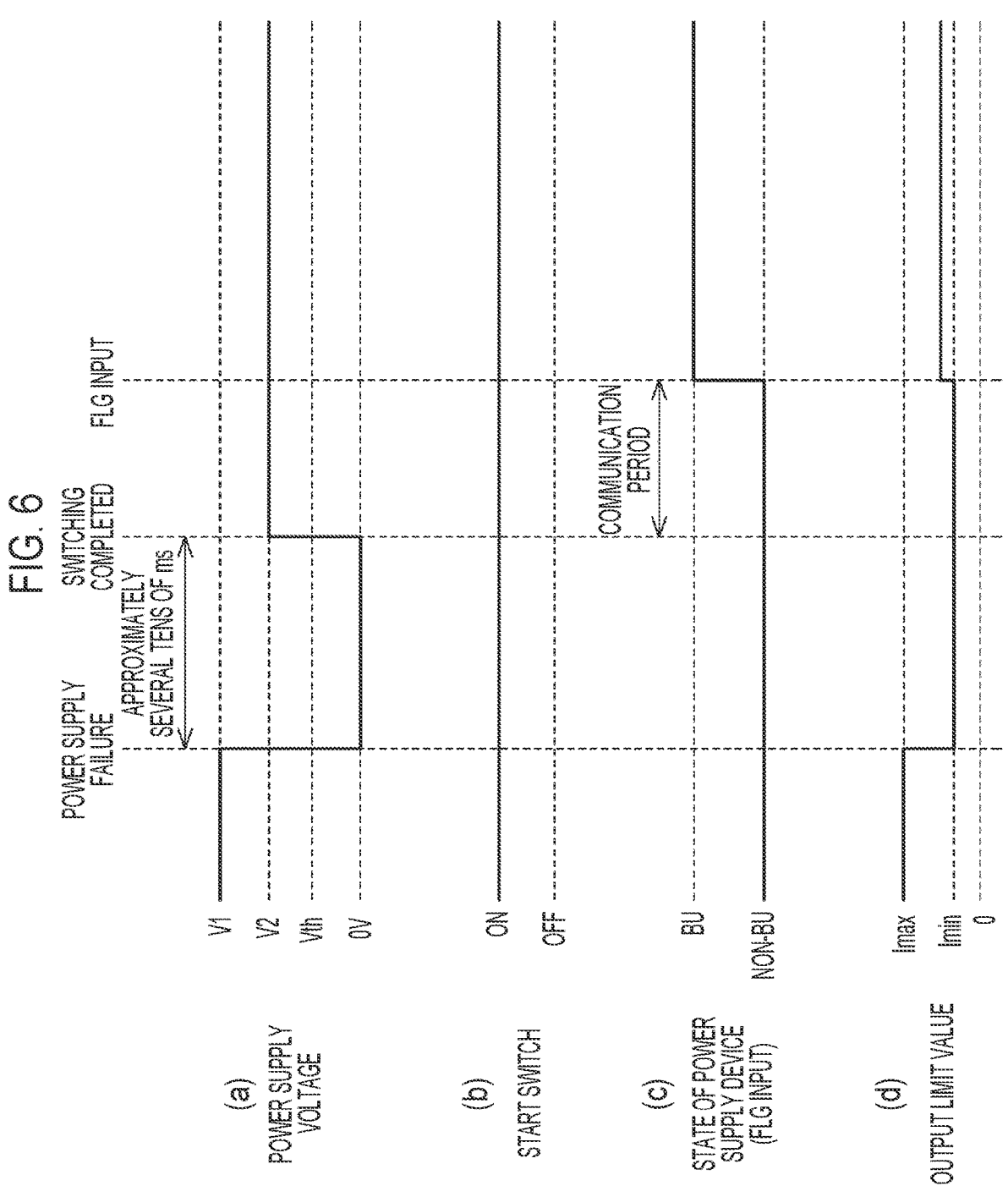
FIG. 6 is a diagram showing (a) a power supply voltage, (b) a state of a start switch, (c) a state of a power supply device, and (d) an output limit value in an embodiment, respectively.

For example, (a) and (b) of FIG. 6 show a state in which, for the on state of the start switch 46, the power supply voltage Vb monitored by the power supply controller 88 and the power supply voltage Vig1 monitored by the main controller 60a of the turning-side controller 60 change with time t. When the start switch 46 is in the on state, the power supply voltage Vb and the power supply voltage Vig1 are basically maintained at the power supply voltage V1 unless the main power supply 45 fails.

In this case, as shown in (c) and (d) of FIG. 6, the main controller 60a determines the state of the power supply device 80 and calculates the output limit value Ilim. The main controller 60a determines that the state of the power supply device 80 is not the backup state ("NON-BU" in the drawing). The main controller 60a calculates the maximum value Imax as the output limit value Ilim. That is, the main controller 60a is in a state in which the normal output limiting process is executed. As a result, the turning-side motor 32 is allowed to generate torque up to the output limit of the turning-side motor 32.

Subsequently, as shown in (a) of FIG. 6, when the main power supply 45 fails ("POWER SUPPLY FAILURE" in the figure), the power supply voltage Vb and the power supply voltage Vig1 drop below the threshold voltage Vth, for example, to a zero value. Such a voltage drop is detected by the monitoring of the power supply controller 88 and the main controller 60a.

In this case, as shown in (c) and (d) of FIG. 6, the main controller 60a determines the state of the power supply device 80 and calculates the output limit value Ilim. The main controller 60a determines that the state of the power supply device 80 is not the backup state ("NON-BU" in the drawing) until the backup switching completion flag FLG is input. Here, a period until the backup switching completion flag FLG is input ("SWITCHING COMPLETED" in the figure) corresponds to a period of "APPROXIMATELY SEVERAL TENS OF ms" (in (a) of FIG. 6) plus "COMMUNICATION PERIOD" (in (c) of FIG. 6). The state of the power supply device 80 determined by the main controller 60a, which is not in the backup state, is determined as the backup transitioning state. The main controller 60a calculates the minimum value Imin as the output limit value Ilim. That is, the main controller 60a is in a state in which the output limiting process at the time of backup transitioning is executed. As a result, the turning-side motor 32 is in a state in which the torque that can be output is limited as compared with before the failure of the main power supply 45.

Then, as shown in (c) of FIG. 6, when the backup switching completion flag FLG is input ("FLG INPUT" in the figure), the main controller 60a determines that the state of the power supply device 80 is the backup state ("BU" in the figure).

Subsequently, as shown in (d) of FIG. 6, the main controller 60a calculates the during-backup limit value Ibu as the output limit value Ilim. That is, the main controller 60a is in a state in which an output limiting process at the time of backup is executed. As a result, the turning-side motor 32 is in a state being allowed to generate as much torque as possible while the torque that can be output is limited as compared with before the failure of the main power supply 45.

According to the present embodiment, when the power supply device 80 completes the switching of the connection state to the backup state in response to the failure of the main power supply 45, the output limiting process at the time of backup transitioning has been already started by the main controller 60a.

Effects of Embodiment (1) In the present embodiment, when the switching of the connection state of the power supply device 80 is completed to the backup state in response to the failure of the main power supply 45, it is possible to suppress the occurrence of a situation in which torque that can be output by the turning-side motor 32 is not limited. Therefore, even when the main power supply 45 fails, it is possible to reduce the possibility of falling into the situation in which torque that can be output by the turning-side motor 32 is not limited.

(2) In the present embodiment, the minimum value Imin of the output limit value Ilim is set as a value in the range below the limit of the power supply performance of the auxiliary power supply 81 on the condition that the power supply performance of the auxiliary power supply 81 is lower than that of the main power supply 45. In this way, when the power supply device 80 is in the backup state, it is possible to reduce the possibility of falling into a situation in which the power supply performance of the auxiliary power supply 81 is exceeded. In this way, the operation of the turning-side motor 32 can suitably continue even when an abnormality of the main power supply 45 is detected. The effect is particularly observable when the power supply performance of the auxiliary power supply 81 is lower than that of the main power supply 45.

(3) In the present embodiment, the main controller 60a of the turning-side controller 60 can determine the state of the power supply device 80 based on the backup switching completion flag FLG. In this way, the main controller 60a can operate in consideration of the state of the power supply device 80. However, in the communication between the main controller 60a and the power supply controller 88, a communication delay occurs.

Here, as a comparative example, it is assumed that the main controller 60a is configured to start limiting the torque that can be output by the turning-side motor 32 after the backup switching completion flag FLG is input. In this case, during the communication delay, the switching of the connection state to the backup state in the power supply device 80 is completed, and limiting of the torque that can be output by the turning-side motor 32 by the main controller 60a is not started.

Figure 7:
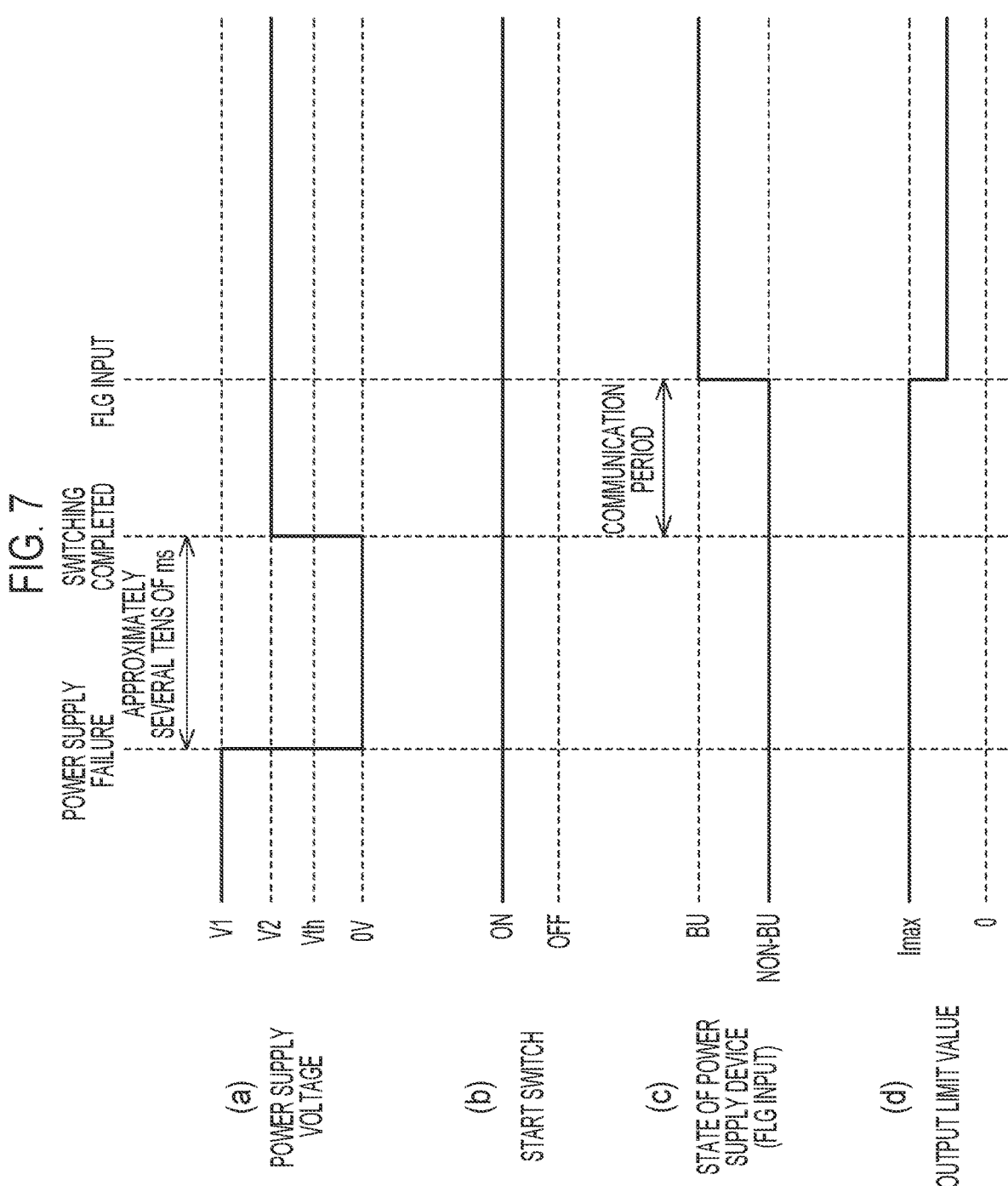
FIG. 7 is a diagram showing (a) a power supply voltage, (b) a state of a start switch, (c) a state of a power supply device, and (d) an output limit value in a comparative example, respectively.

For example, as shown in (c) of FIG. 7, in the same way as in (c) of FIG. 6, the main controller 60a determines that the state of the power supply device 80 is not the backup state ("NON-BU" in the figure) until the backup switching completion flag FLG is input.

On the other hand, as shown in (d) of FIG. 7, unlike (d) of FIG. 6, the maximum value Imax is calculated as the output limit value Ilim. Then, when the backup switching completion flag FLG is input ("FLG INPUT" in the figure), the main controller 60a determines that the state of the power supply device 80 is the backup state ("BU" in the figure).

That is, in the case of the comparative example, after the voltage drop of the main power supply 45 is detected, in the main controller 60a, torque that can be output by the turning-side motor 32 is not limited until the backup switching completion flag FLG is input. In particular, during a period corresponding to the "COMMUNICATION PERIOD" (in (c) of FIG. 6), the torque that can be output by the turning-side motor 32 is not limited, even though the power supply device 80 has completed the switching of the connection state to the backup state.

On the other hand, as shown in (c) and (d) of FIG. 6, when the failure of the main power supply 45 is detected, the main controller 60a according to the present embodiment can start limiting the torque that can be output by the turning-side motor 32 earlier than the backup switching completion flag FLG is input. Therefore, in the configuration in which the main controller 60a and the power supply controller 88 communicate with each other, in the backup state of the power supply device 80, it is possible to reduce the possibility of falling into the situation in which the torque that can be output by the turning-side motor 32 is not limited.

(4) According to the present embodiment, while the start switch 46 is in the on state, electric power is continuously supplied to the control circuit 62a included in the main controller 60a even though the main power supply 45 fails. In this case, the control circuit 62a can start controlling the torque that can be output by the turning-side motor 32 when the main power supply 45 fails.

Other Embodiments

The above embodiment may be modified as follows. Furthermore, other embodiments below can be combined with each other in an extent that does not have any technical contradiction.

The diodes 86, 87 may form an OR circuit inside the turning-side controller 60, that is, the steering control device 1. Even in this way, the electric power selected from the main power supply 45 or the auxiliary power supply 81, whichever has a higher supply voltage, is supplied to the turning-side controller 60.

The power supply performance of the auxiliary power supply 81 may be approximately equal to that of the main power supply 45 or may be higher than that of the main power supply 45. For example, the power supply capacity of the auxiliary power supply 81 may be approximately equal to that of the main power supply 45 or may be set larger than that of the main power supply 45. In this case, for example, the power supply voltage V2 of the auxiliary power supply 81 may be set to a value approximately equal to the power supply voltage V1 of the main power supply 45 or may be set higher than the power supply voltage V1 of the main power supply 45.

An electric double layer capacitor or a secondary battery may be employed for the auxiliary power supply 81.

The power supply device 80 may operate to provide assistance by backing up electric power supply to each of the controllers 50, 60 in place of the main power supply 45, and in addition, to provide assistance by boosting the electric power supplied by the main power supply 45.

The configuration related to the backup switching completion flag FLG may be eliminated. In this case, when the time assumed to complete switching of the connection state to the backup state in the power supply device 80 has elapsed after detection of a failure of the main power supply 45, the main controller 60a of the turning-side controller 60 may determine that the state of the power supply device 80 is the backup state. Further, the main controller 60a may determine that the state of the power supply device 80 is the backup state when the power supply voltage Vig1 that is equal to or higher than the threshold voltage Vth is detected.

In the controllers 50, 60, the respective sub controllers 50b, 60b may be eliminated and one-system configurations of the main controllers 50a, 60a may be respectively provided. In this case, regarding each of the main controllers 50a, 60a in the one-system configurations, it is sufficient as long as it has a function of detecting the power supply voltage that is needed.

In the controllers 50, 60, each of the sub controllers 50b, 60b may be configured to be connected to the main power supply 45 through the power supply device 80. In this case, regarding each of the main controllers 50a,

60a in the one-system configurations, it is sufficient as long as it has a function of detecting the power supply voltage that is needed.

When a different value is calculated as the output limit value Ilim, the limit controller 103 may have a function of gradually changing the output limit value Ilim with respect to the different value. In this case, it is possible to suppress the influence of the change in the output limit value Ilim on the behavior of the vehicle and ensure the comfort of vehicle occupants.

The output limit value Ilim may have a plurality of values depending on causes other than the failure of the main power supply 45. For example, when a plurality of values is candidates for the output limit value Ilim, it is sufficient for the limit controller 103 as long as it has a function such as selecting the minimum value among the candidates. That is, the limit controller 103 may be configured to be able to finally calculate the output limit value Ilim that is equal to or less than the minimum value Imin when the main power supply 45 fails.

The power supply device 80 may include a steering section power supply device connected merely to the steering section 4 including the steering-side controller 50, and a turning section power supply device connected merely to the turning section 6 including the turning-side controller 60.

The steering control device 1 may be configured to include one controller by making any one of the controllers 50, 60 have a function that integrates the function of operating the steering-side motor 13 and the function of operating the turning-side motor 32.

The turning-side motor 32 may be employed to be provided, for example, coaxially with the rack shaft 22, or to be connected to a pinion shaft that constitutes a rack and pinion mechanism on the rack shaft 22 through the worm and wheel.

Each of the controllers 50, 60 and the steering control device 1 including the controllers may be constituted by processing circuits including 1) one or more processors that operate according to a computer program (software), 2) one or more dedicated hardware circuits, such as application specific integrated circuits (ASICs), which execute at least some of the various processes, or 3) combinations thereof. The processor includes a CPU and memory, such as RAM and ROM, and the memory stores program codes or instructions configured to cause the CPU to execute processes. The memory, that is, non-transitory computer-readable medium, includes any available media that can be accessed by a general purpose or special purpose computer. The same applies to the power supply controller 88 and the power supply device 80 including the power supply controller 88.

The steering device 2 has been described as linkless structure in which the steering section 4 and the turning section 6 are mechanically separated at all times; however, the steering device 2 is not limited thereto, and, may, for example, have a structure in which the steering section 4 and the turning section 6 can be mechanically separated by a clutch. Further, the steering device 2 is not limited to the steer-by-wire kind steering device, and may be an electric power steering device that applies motor torque to the steering shaft 11 or the rack shaft 22.

What is claimed is:

1. A steering control device that is connected to a first power supply mounted on a vehicle through a power supply device and that controls a steering device mounted on the vehicle, the power supply device including a second power supply, the steering control device comprising a controller, the controller including a drive circuit that performs action for supplying, to a motor, electric power supplied by being connected to at least one of the first power supply and the second power supply, and the controller being configured to control an operation of the motor by controlling the action of the drive circuit, wherein:

in a case where a connection state of the drive circuit with respect to the first power supply and the second power supply is a first state when electric power is supplied from the first power supply, the connection state is switched by the power supply device to transition to a second state that is a state in which electric power is supplied from the second power supply when an abnormality of the first power supply is detected; and the controller is configured to execute an output limiting process that limits torque that is outputtable by the motor after the abnormality of the first power supply is detected as compared with before the abnormality is detected, and the output limiting process is started after the abnormality of the first power supply is detected and before switching of the connection state to the second state in response to detection of the abnormality being completed, the switching of the connection state being performed by the power supply device, the motor to be controlled includes:

i) only a steering side motor, ii) only a turning side motor, iii) the steering side motor and the turning side motor, and iv) one of the steering side motor and the turning side motor, and the output limiting process limits torque output by the motor such that the torque does not exceed an output limit value, wherein the output limit value is a value less than a limit of a power supply performance of the second power supply defined by a power supply capacity or power supply voltage of the second power supply on a condition that the power supply performance of the second power supply is lower than a power supply performance of the first power supply.

2. The steering control device according to claim 1, wherein:

the power supply device includes a power supply controller that is configured to switch the connection state such that the connection state transitions to the second state in response to the detection of the abnormality of the first power supply; and the controller is configured to be connected to the power supply controller so as to be able to communicate with the power supply controller through a line, and configured to acquire, from the power supply controller through the line, information indicating that the switching of the connection state is completed in a case where the connection state transitions to the second state.

3. The steering control device according to claim 1, wherein the controller is configured to execute the output limiting process while a power supply of the vehicle is in an on state allowing connection to the first power supply such that an operation of the vehicle is possible.

4. The steering control device according to claim 3, wherein:

the controller includes a control circuit that executes a process related to the output limiting process; and the control circuit is configured to be connected to at least one of the first power supply and the second power supply, and be at all times connected to at least one of the first power supply and the second power supply through a connection circuit included in the power supply device while the power supply of the vehicle is in the on state, regardless of a state of the first power supply.

5. The steering control device according to claim 1, the power supply device includes a power supply controller that is configured to switch the connection state such that the connection state transitions to the second state in response to the detection of the abnormality of the first power supply, the controller is configured to be connected to the power supply controller so as to be able to communicate with the power supply controller through a line, and configured to acquire, from the power supply controller through the line, information indicating that the switching of the connection state is completed in a case where the connection state transitions to the second state, and the controller is configured to set the output limit value and a during-backup limit value according to the information obtained from the controller thorough the line indicating that the switching has been completed.

* * * * *